United States Patent
Li et al.

(10) Patent No.: US 9,959,637 B2
(45) Date of Patent: May 1, 2018

(54) METHOD AND APPARATUS FOR PROCESSING BORDER OF COMPUTER FIGURE TO BE MERGED INTO BACKGROUND IMAGE

(71) Applicant: Framy Inc., Grand Cayman (KY)

(72) Inventors: Yu-Hsien Li, Taipei (TW); Chen-Chou Lin, Taipei (TW)

(73) Assignee: FRAMY INC., Grand Cayman (KY)

( * ) Notice: Subject to any disclaimer, the term of this patent is extended or adjusted under 35 U.S.C. 154(b) by 37 days.

(21) Appl. No.: 15/077,986

(22) Filed: Mar. 23, 2016

(65) Prior Publication Data
US 2017/0186188 A1    Jun. 29, 2017

(30) Foreign Application Priority Data
Dec. 23, 2015  (TW) .............................. 104143356 A

(51) Int. Cl.
| | | |
|---|---|---|
| *G06F 3/0484* | (2013.01) | |
| *G09G 5/377* | (2006.01) | |
| *G06T 11/00* | (2006.01) | |
| *G06T 3/00* | (2006.01) | |
| *G06F 3/0488* | (2013.01) | |

(52) U.S. Cl.
CPC ............ *G06T 11/00* (2013.01); *G06F 3/0488* (2013.01); *G06F 3/04845* (2013.01); *G06T 3/0006* (2013.01); *G06T 11/001* (2013.01); *G06T 2207/20192* (2013.01); *G06T 2207/20221* (2013.01)

(58) Field of Classification Search
CPC .. G06F 3/04845; G06F 3/048; G06F 3/04842; G06F 3/04883; G06T 11/00; G06T 3/0006; G06T 11/001; G06T 11/60; G06T 15/503
USPC ......... 345/629, 582, 639; 715/761, 863, 835
See application file for complete search history.

(56) References Cited

U.S. PATENT DOCUMENTS

| | | | |
|---|---|---|---|
| 2002/0114532 A1 | 8/2002 | Ratner et al. | |
| 2005/0001854 A1* | 1/2005 | Schuster | ............... G06T 11/001 345/639 |
| 2005/0168476 A1* | 8/2005 | Levene | ................. G06T 15/503 345/582 |
| 2008/0187222 A1 | 8/2008 | Ernst et al. | |

(Continued)

FOREIGN PATENT DOCUMENTS

TW    I495354 B    3/2014

*Primary Examiner* — Jin-Cheng Wang
(74) *Attorney, Agent, or Firm* — Li&Cai Intellectual Property (USA) Office

(57) ABSTRACT

The disclosure is related to a method and a computer apparatus for processing a border of a computer figure and merging the figure into a background image. In the method, a user interface is provided for the user to operate the computer figure through a touch screen. The computer figure is configured to be merged into a background image, or a specific image object. The computer figure is processed by performing a border-treatment algorithm when it is moved and combined with the background image. In the process of border-treatment, the graphic information of the background image is taken into consideration. The computer figure is allowed to be well merged into the background image by considering the background's graphic information when the images are combined. Therefore, a visual effect of fusing the images can be achieved.

12 Claims, 9 Drawing Sheets

(56) References Cited

U.S. PATENT DOCUMENTS

| | | | | |
|---|---|---|---|---|
| 2011/0191718 | A1* | 8/2011 | Hinckley | G06F 3/033 |
| | | | | 715/835 |
| 2012/0274808 | A1* | 11/2012 | Chong | H04N 5/23293 |
| | | | | 348/234 |
| 2013/0223758 | A1* | 8/2013 | Hou | G06T 3/4038 |
| | | | | 382/274 |
| 2013/0263027 | A1* | 10/2013 | Petschnigg | G06T 11/00 |
| | | | | 715/761 |
| 2016/0321214 | A1* | 11/2016 | Hickey | G06F 3/0484 |

* cited by examiner

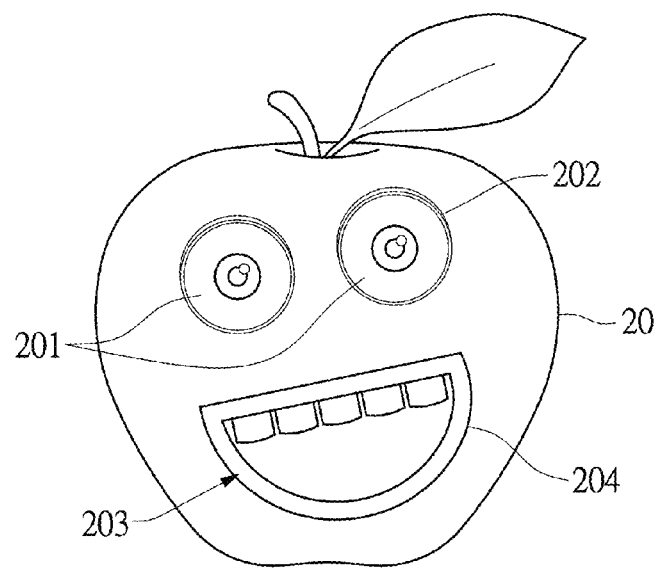
FIG.2
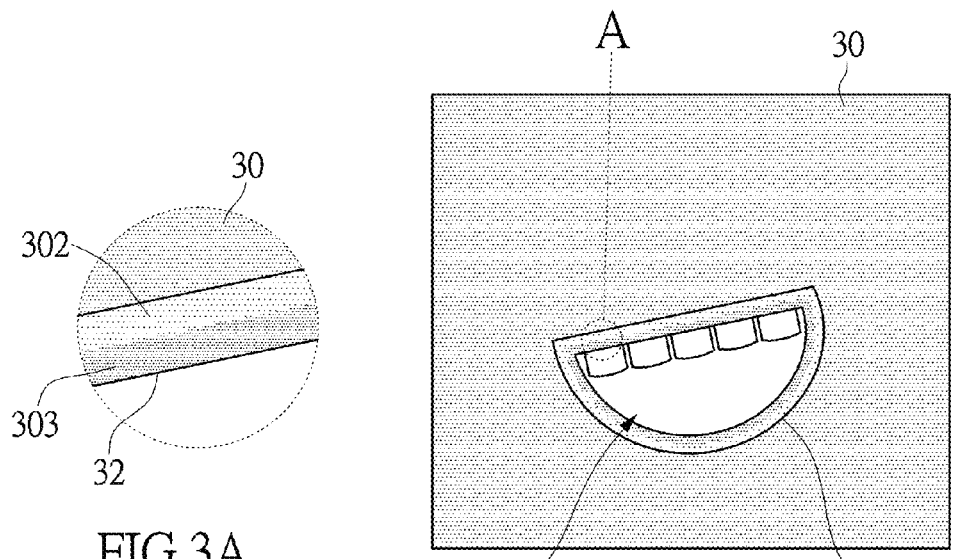
FIG.3A
FIG.3

METHOD AND APPARATUS FOR PROCESSING BORDER OF COMPUTER FIGURE TO BE MERGED INTO BACKGROUND IMAGE

BACKGROUND OF THE INVENTION

1. Field of the Invention

The present invention is related to a technology of sticking computer figures, in particular to a method for merging a computer figure into a background image in consideration of a border effect there-between and a computer device thereof.

2. Description of Related Art

When a user manipulates a computer device to perform sticking a computer figure, a background image is first selected. A computer figure is provided and formed onto the background image when a sticking position is selected. The computer figure therefore overlaps the selected position of the background image. A new figure including the computer sticker image is created.

FIG. 8 schematically shows a conventional technology to create sticker image. In a display of a computer device, a background object 801 is selected. The background object 801 is such as a scene, people, or article that is provided for a user to stick a sticker image or any picture over the background object 801. The sticker image forms a foreground object 802, and an image combining the foreground and background images is then created after image processing. However, the conventional computer sticker image merely acts as a foreground image stuck to the background image. Even though some conventional functions allow the user to adjust the images, there is no impressive visual effect made to the final image. For example, the conventional technology does not render any effective method to produce the visual effect of merging the sticker image being a foreground image to the background image.

SUMMARY OF THE INVENTION

Disclosure of the present invention is related to a method for processing a border of a computer figure which is configured to be merged to a background image and a computer device for the same. One of the objectives of the present invention is to render a visual effect that makes a foreground image be well merged to a background image when sticking the foreground image on the background image. In an aspect of the invention, a border effect is applied to the border range of the foreground image based on a certain correlation between the foreground and background images. The method in the present invention allows the foreground image to be harmonized with the background image.

In one embodiment of the present invention, a software program is installed in a computer device and is used to capture a computer figure. The computer figure is shown over a background image displayed in a computer display. The software program retrieves the border information of the computer figure. For example, the border image of the computer figure can be defined by a set of coordinates. Then a certain range of the border image can be determined. The information relating to the pixels of the background image corresponding to the border image range can be obtained. A border effect is applied to the pixels of the background image corresponding to the border image range of the computer figure. The computer figure with the border effect is merged to the background image. It is noted that the border effect is such as a visual convex-lens effect or a concave-lens effect applied to all or part of the border image of the computer figure.

In one further embodiment of the present invention, a computer figure is provided; and a computer display with a touch panel is used to display the computer figure. The computer figure occupies a certain range over the background image. The software program is programmed to determine the position of the computer figure according to the touch signals related to the computer figure. Information relating to the border of the computer figure can be obtained based on its range and position. Information of pixels of the background image corresponding to the border image can be also obtained. After that, a border effect is applied to the pixels so as to form a computer figure with the border effect merged to the background image.

In the mentioned process, the user can move the computer figure over the touch panel, and also is able to resize and rotate the figure. The software program is programmed to continuously receive the touch signals with respect to the gesture operations. If any change happens to the computer figure, the mentioned border effect is instantly applied to the pixels of the background image corresponding to the border image range of the figure.

The disclosure is also related to a computer device including a processor and a memory. The memory stores a set of instructions executed by the processor for processing the border of the computer figure to be merged to a background image. The instructions include instruction for retrieving border information of the computer figure displayed in a computer display; instruction for determining position of the computer figure in response to touch signals with respect to the computer figure; instruction for retrieving pixel information of the background image corresponding to a border image range of the computer figure; instruction for applying a border effect to the pixels of the background image corresponding to the border image range; instruction for merging the computer figure with the border effect to the background image; and instruction for recording variations of the computer figure according to touch signals in process of moving, resizing and/or rotating the computer figure.

BRIEF DESCRIPTION OF THE DRAWINGS

FIG. 2 shows an example of composited images made by the method for processing a border of the computer figure to be merged to the background image;

FIG. 3 shows a schematic diagram describing the process for processing the border of the computer figure to be merged to the background image;

FIG. 3A schematically shows an enlarged picture depicting the visual effect of the border of the computer figure;

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

To accomplish a visual effect that renders a computer figure merged to a background image when the two images are combined, the present invention provides a method for processing a border of the computer figure and a computer device for implementing the method. The computer device is preferably a device having a touch panel, by which a user interface is provided. The background image is displayed in the touch panel. The user interface allows a user to select a computer figure acting as a sticker image attached with the background image. In the process of operating the sticker image, the computer figure can be adjusted, for example the placement of the computer figure can be changed, and the figure can be resized, and/or rotated. It is characterized in that a border effect is applied to the border image of the computer figure and the border and its corresponding range in the background image are instantly computed when the computer figure alters. The computer figure is therefore merged to the background image.

One of the objectives of the present invention is to optimize the combination of the computer figure and the background image. The computer figure can be a virtual object, and the background image can be a real scene. For the optimization, a border effect is applied to the border of the computer figure and the corresponding pixels of the background image. It is noted that the border effect can be a lens effect applied to the border that renders the computer figure visually merged to the background image.

Figure 1A:
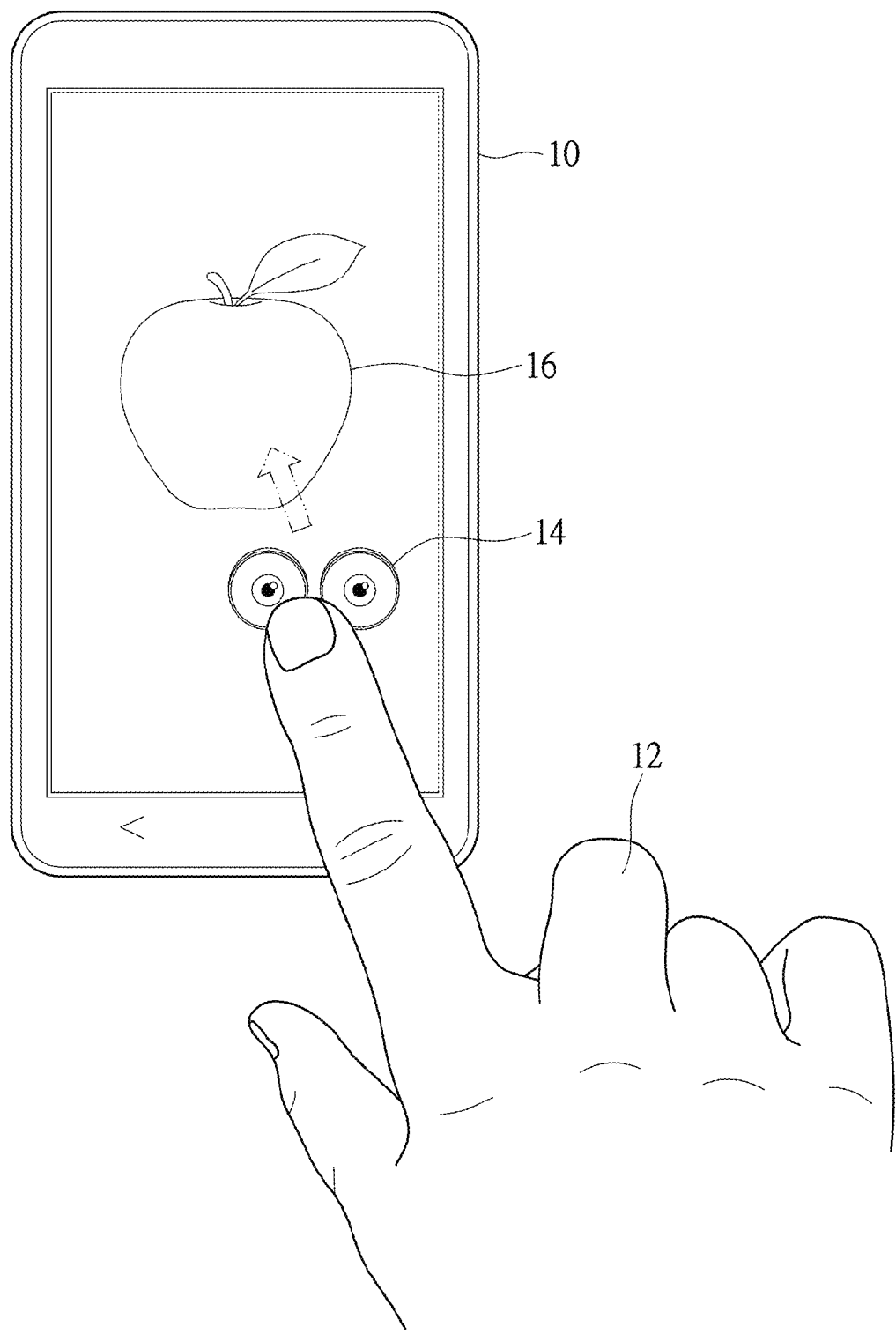
FIG. 1A and FIG. 1B schematically show a circumstance of operation in the method for processing a border of a computer figure to be merged to a background image.
Figure 1B:
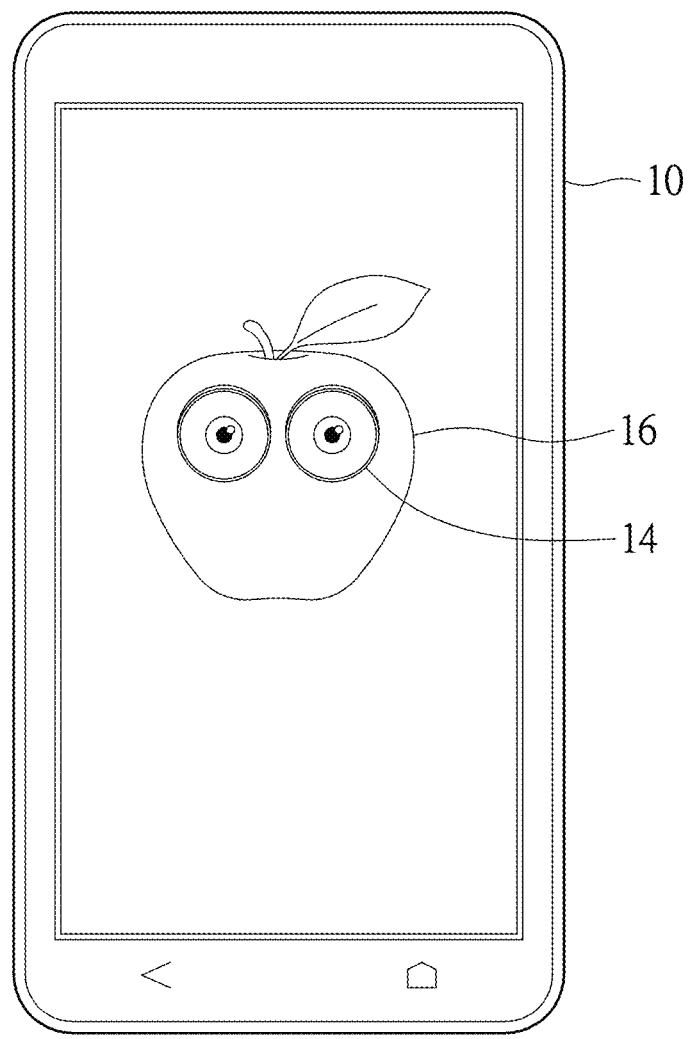

A computer device having a touch panel can be utilized in one aspect of the present invention. FIG. 1A and FIG. 1B schematically show a circumstance conducting the method for processing the border of the computer figure to be merged to the background image.

In FIG. 1A, a computer device 10 with a touch panel is shown. A background object 16 is at a specific place over the touch panel. Alternatively, the whole scene of the screen acts as the background image. The function of the touch panel allows a user to operate the computer FIG. 14 using his hand 12. For example, the user can move the computer FIG. 14 to a position by a gesture operation using the user's hand 12. This gesture operation correspondingly generates a series of touch signals representing moving the computer FIG. 14 over the background object 16 until his hand 12 is removed from the touch panel. The touch signals also show the computer that FIG. 14 has stopped moving. At this moment, the computer figure acts as a sticker image attached to the background object 16. A software program is programmed to form a final picture, as shown in FIG. 1B.

In one aspect of the present invention, the method allows the user to operate the computer FIG. 14 to be combined with the background object 16, a background image, or a specific image via a user interface in the touch panel. In the process of moving the computer FIG. 14, the system performs a border-treatment algorithm using a series of computations for the border of the computer FIG. 14. To process the border of the computer FIG. 14, the image data of the background object 16 or the whole background image are taken into consideration. Since the border image is processed, the computer FIG. 14 has been visually merged to the background when the two images are integrated as one. In another aspect of the present invention, the border process can be performed after the computer FIG. 14 is affirmed to be at a specific position so as to merge the computer FIG. 14 to the background.

Based on the method for processing the border described in the above embodiment, an example of the final picture formed by the computer figure being merged to the background image is shown in FIG. 2.

In this example, a fruit-shaped background object 20 is shown. This background object 20 is formed by compositing two images which are respectively a first computer FIG. 201 and a second computer FIG. 203. The first computer FIG. 201 is exemplarily a pair of eyes, and the second computer FIG. 203 is such as a mouth. It is different from a sticker image directly attached to an image object in the conventional technology; the method in accordance with the present invention is first to retrieve border information of every computer FIG. 201, 203) and then the information of the background image corresponding to the border range. Based on the information of the border, a final picture can be obtained by applying a border effect to the border that is merged to the background image through an operation in mathematics. In the schematic diagram, the border of the first computer FIG. 201 renders a first border image 202 through the operation in mathematics; the border of the second computer FIG. 203 renders a second border image 204. The border images (202, 204) form a visual effect that allows the computer FIGS. 201, 203) to be merged to a target image. It is noted that the visual effect made by incorporating the border effect applied to the border image of the computer figure is different from the conventional sticker image simply stuck to another image.

Reference is next made to FIG. 3. FIG. 3 shows an exemplary example of the border image processed to incorporate the border effect that allows the computer figure to be well merged to the background image.

The diagram shows a background image 30 drawn by the dots with a certain density. A mouth-shaped computer FIG. 31 is stuck thereon. When this mouth-shaped computer FIG. 31 is configured to be combined with the dotted background image 30, the border of the computer FIG. 31 can be continuously processed by a redrawing process for maintaining a border image 32 of the computer FIG. 31.

In the present example, the image effect made to the border of the computer FIG. 31 is represented by the region A. FIG. 3A schematically shows an enlarged image of the region A.

FIG. 3A exemplarily shows a section of the border 32 of the computer FIG. 31. The diagram shows the image with gradient changes. For example, an upper region 302 and a lower region 303 are respectively drawn with dots with different densities for indicating the various degrees of border effects. In general, the upper region 302 next to the background image 30 can be drawn with lower-density of dots; the lower region 303 is full of dots with a different density. The image of the upper region 302 is gradually changed to the lower region 303. In an aspect of the present invention, color and/or transparency of the image can be varied in the border image 32 for rendering the visual effect.

For example, the transparency of the border image can be gradually changed based on pixel information of the background image. Also, the color of the border image can be gradually changed based on the pixel information of the background image within the range of the border image. The border effect allows the computer figure to be well merged to the background image. Visually, the computer figure is integrated to the background better than the conventional sticker image.

Figure 9:
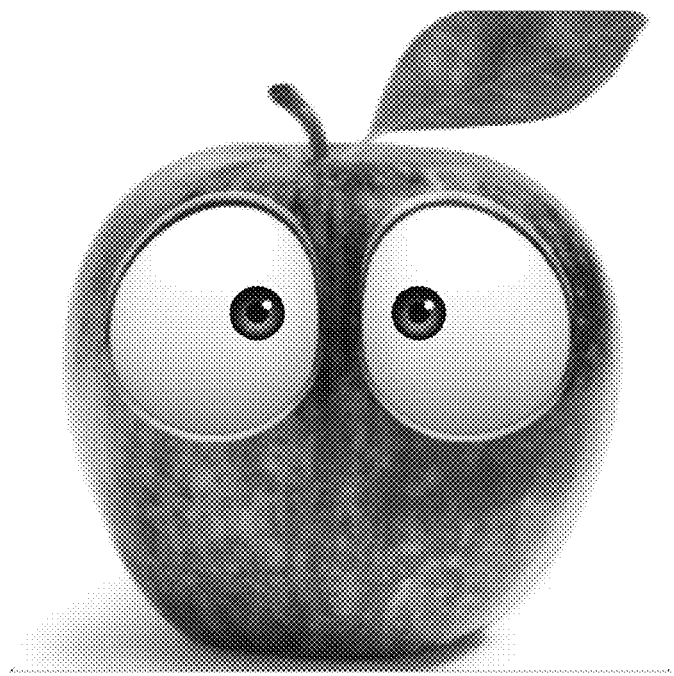
FIG. 9 shows a final image formed by the method of the present invention.
Figure 10:
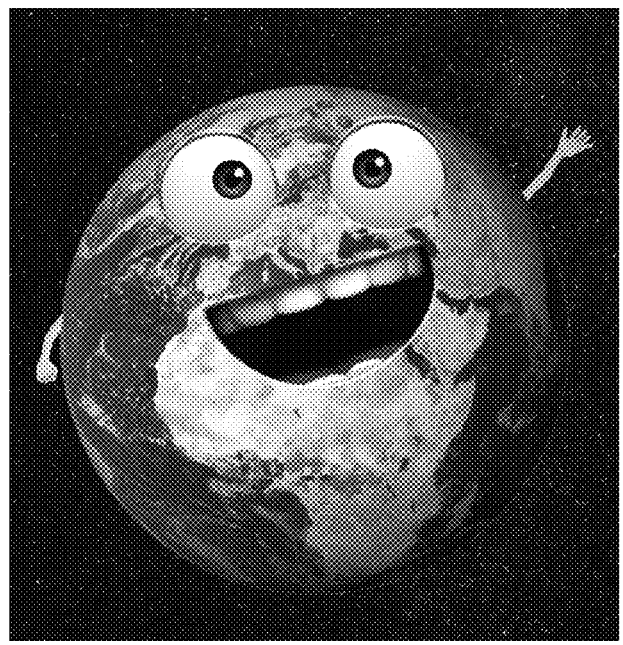
FIG. 10 shows another image formed by the method of the present invention.

The picture shown in FIG. 9 clearly describes the visual effect of the computer figure merged to the background image by means of border processing in accordance with the present invention. FIG. 10 shows the computer figure being merged to the color background in another example formed by the method of the present invention. It shows a border effect such as a lens applied to the border image by instant computation in consideration of the background image. The border effect renders a visual effect that allows the figure to be well integrated with the background.

Figure 4:
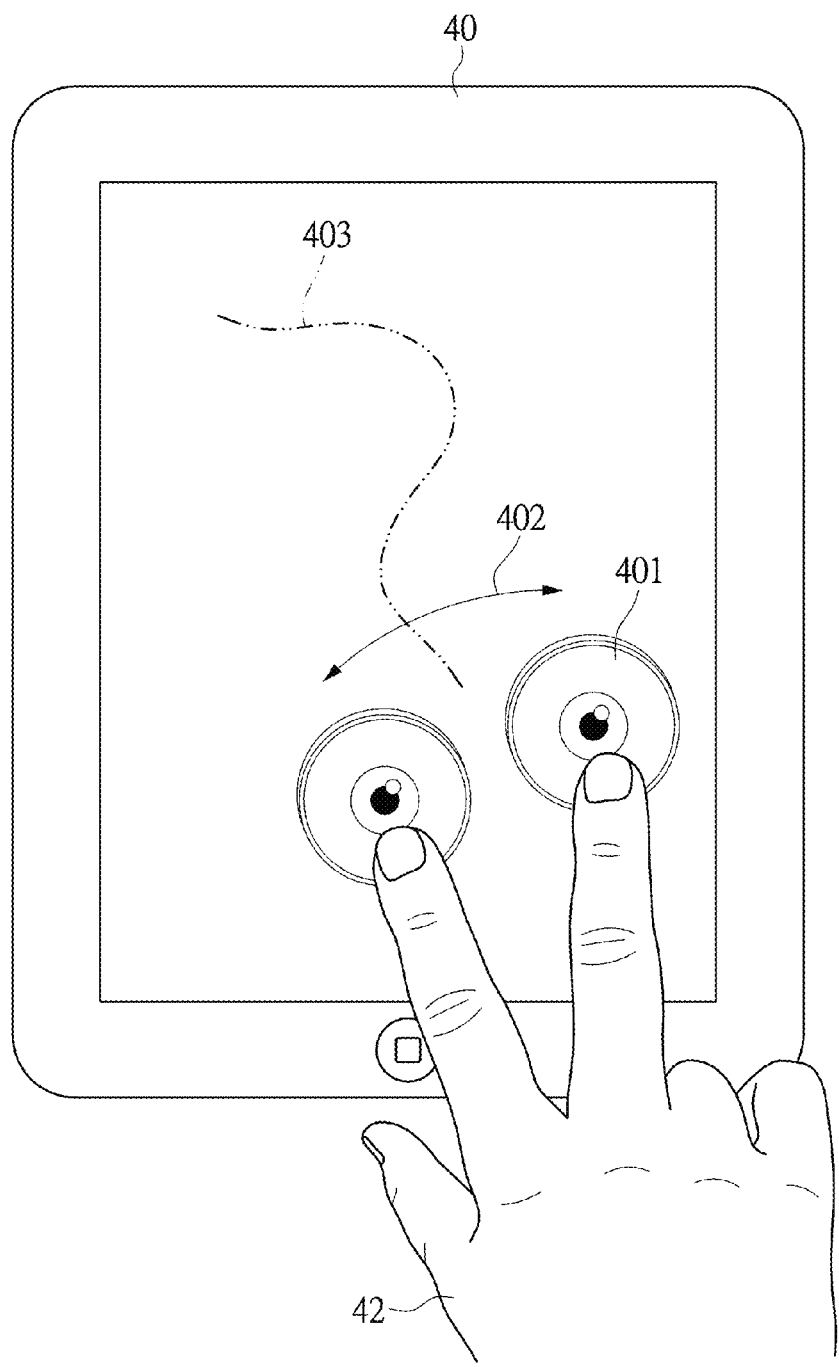
FIG. 4 shows a schematic diagram depicting an example of image variation in the method for processing a border of the computer figure in accordance with the present invention.

FIG. 4 further shows a schematic diagram describing an example of the status of a computer figure being adjustable while it is configured to be merged into the background image by the method for processing border of the computer figure in accordance with the present invention. In the present exemplary example, the computer device 40 allows a user to touch a computer FIG. 401 shown on a screen and operate the computer FIG. 401 using his finger 42. The gesture operations made by the user's finger 42 can be not only moving the figure's position, and but also changing the size and orientation (402) of the computer FIG. 401. In the process of adjusting the status of the computer FIG. 401, a correlation between the border image and the corresponding background image can be instantaneously computed, and a border effect is instantly applied to the figure. Therefore, the computer figure can be visually merged to the background image by applying the border effect in the process of varying the computer figure.

In one further aspect of the present invention, a software means is provided to form a moving track when the computer FIG. 401 is moved. The track can be recorded. The computer figure can also be resized and/or rotated in the movement. The variations of the computer FIG. 401 in a period of time can be recorded in response to the touch signals based on the gesture operations. An animation is created.

Figure 5:
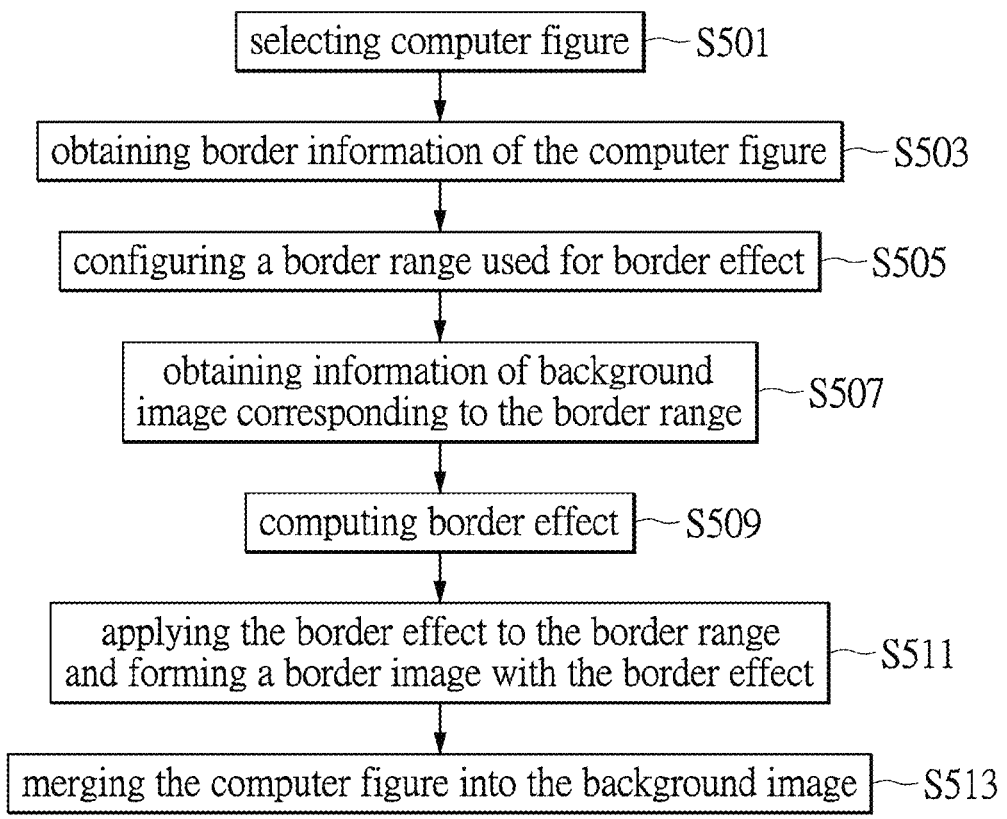
FIG. 5 shows a flow chart describing the method for processing a border of a computer figure to be merged to a background image in one embodiment of the present invention.

To implement the visual effect that renders the computer figure to be merged to the background image, reference is made to FIG. 5 showing a flow chart of the method. The method can be implemented by software, and the following order of steps is not a limitation to the scope of the present invention.

In the beginning of the method, such as step S501, a computer device renders a user interface such as a touch panel, a graphical user interface or a menu provided for the user to select a computer figure. The computer figure can be a static image or an animation. The computer figure may be a whole picture, or an image covering part of a picture. The animation may denote a tiny variation of a specific portion of the picture, e.g. the variation of the hand or foot of an animal. The user can also select another one static or animated background image, or a background object. After that, the software-implemented means gains information relating to the border image of the computer figure displayed in the computer display. The border image denotes all or part of the border of the computer figure. In step S503, the information of the border image is obtained by the software including image coordinate values of the border, and the image pixel values based on the data of the display.

Next, in step S505, a default value or the user's setting is used to define a range of the border image for applying a border effect. The range of the border image can be an equal width or not an equal width along the border of the figure. After step S505, in the same time with the step S505 or before the step S505, the software means gains information of the display hardware, in step S507, so as to obtain the pixel information of the background image corresponding to the border image of the computer figure. The pixel image is such as colors and brightness. Based on this information, a border effect can be calculated, as in step S509.

In one embodiment, the border effect can be an image effect of a convex lens or concave lens applied to all or part of the border image of the computer figure. When the image effect of convex lens or concave lens is calculated according to the information of border of the computer figure, the image effect is combined with the portion of the corresponding background image. After that, the border image is merged to the background image. To form the border effect, the effect may also include changing the transparency of the border and/or changing colors of the border.

After the border effect has been defined, the border effect is then applied to the pixels of the corresponding border image of the background image, such as in step S511. The computer figure with border effect is then created. With this border image, the computer figure can be visually integrated with the background image. That means the border effect renders a visual effect that appears as the computer figure merged to the background, as in step S513.

It is worth noting that the above flow can also be applied to the computer figure with the computer figure finally located; or applied to timings when the user operates the computer figure in process. In the later approach, the border effect is instantly formed by instant calculation. It is continuously obtaining the border information of the computer figure, obtaining pixel information of the border image of the background image corresponding to the border of the computer figure, and applying the border effect every time the position, size and angle of computer figure is changed. It shows the computer figure visually merged to the background in every moment.

Figure 6:
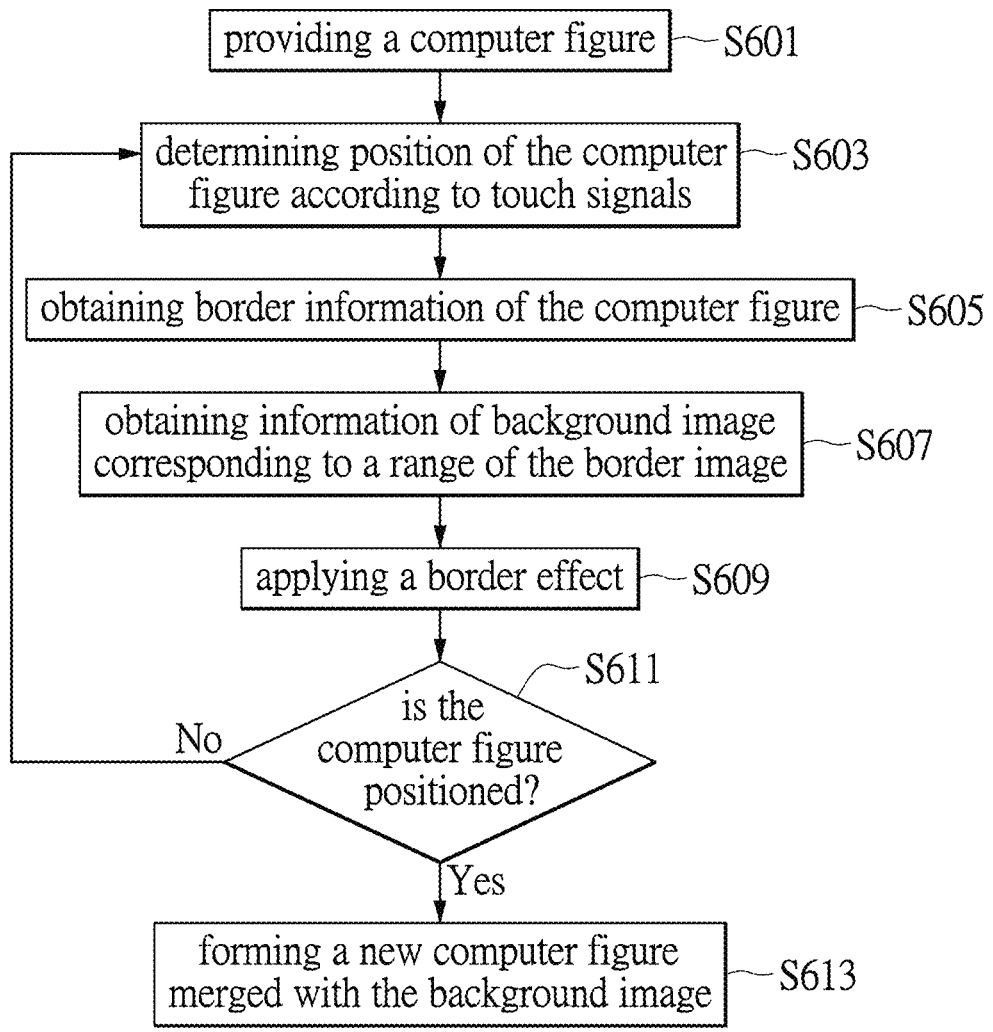
FIG. 6 shows a flow chart describing the method for processing a border of a computer figure to be merged to a background image in another embodiment of the present invention.

The software-implemented method should be cooperated with a computer system, especially to the computer device with touch panel. FIG. 6 shows a flow chart of the method in one related embodiment in accordance with the present invention.

In the method for processing the border of the computer figure to be merged to the background image, at least one computer figure is displayed in a touch panel of the computer device. The computer figure occupies a range of the display, such as in step S601. Next, the user can operate the computer figure to move or any other change through the touch panel so as to generate touch signals. The system can determine the position and area of the figure based on the touch signals. In step S603, the border information of the computer figure can be continuously obtained according to the position of the computer figure and the area occupied by the figure. The border information includes the image information around the border, and the coordinates in the touch panel, such as in step S605. The pixel information of the background image corresponding to the border image of the computer figure is also obtained, in step S607.

After that, in step S609, the system performs image processing to apply the border effect according to the pixel information of the background image corresponding to border image of the computer figure. In step S611, the system determines whether or not the computer figure is finally positioned according to the user's operation.

When the user's operation indicates the computer figure is not yet finally positioned, the computer figure may be still be in the process of moving, resizing, rotating, or a combination thereof. In an exemplary example, the system determines the computer figure has not yet finally been positioned when it detects the user's finger is still on the touch panel according to the touch signals. The process may repeat the operations described in the steps S605 through S609. The border effect is instantly calculated every moment or based on every variation of the figure.

In the process, through both software and hardware, the system determines the position of the computer figure in response to the touch signals. The size of the computer figure can be determined based on the touch signals regarding resizing. Further, the orientation of the computer figure can be determined based on the touch signals regarding rotation. A border searching process is continuously performed for obtaining the border information of the computer figure. The above information helps the system to determine the position, size and angle of the computer figure. Thus the border effect is also continuously performed to the computer figure in every variant moment, including detecting the position of the figure, detecting the border of the figure, obtaining pixel information of the range of the background image corresponding to the border image of the figure, and applying the border effect until the computer figure is finally positioned.

In the last status, the system determines that the user has decided the position of the computer figure based on the touch signals. For example, when the user's finger leaves the touch panel, the signals are dismissed and the system acknowledges the figure is finally positioned. In step S613, a new computer figure is generated when the original computer figure with border effect is merged to the background image.

Figure 7:
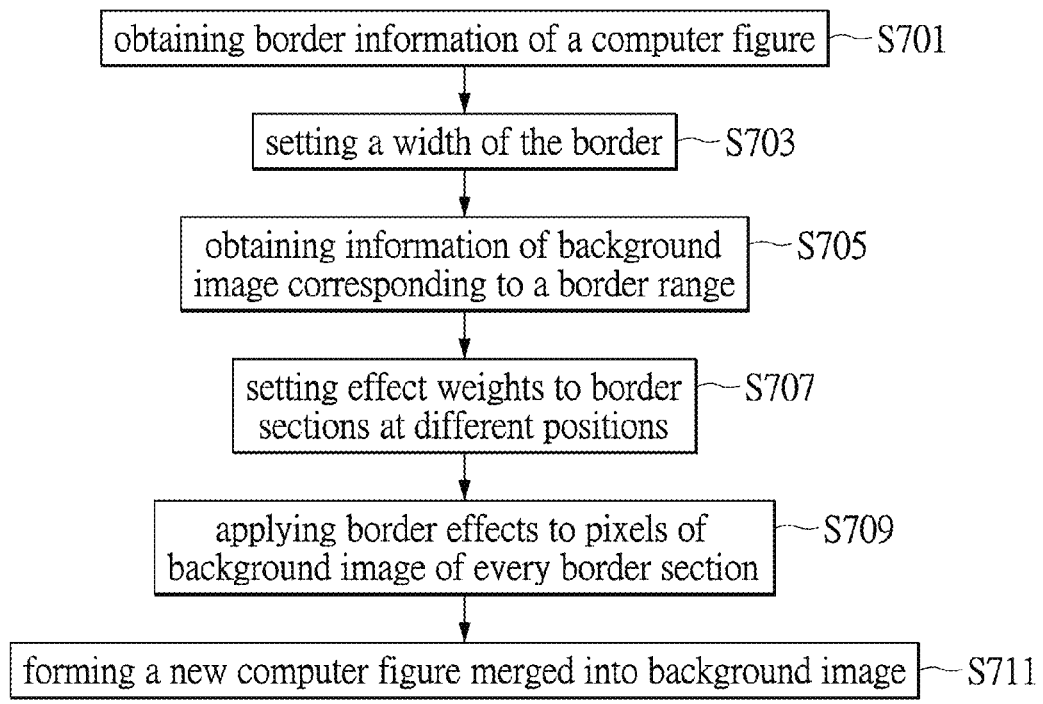
FIG. 7 shows a flow chart describing the method for processing a border of a computer figure to be merged to a background image in one more embodiment of the present invention.
Figure 8:
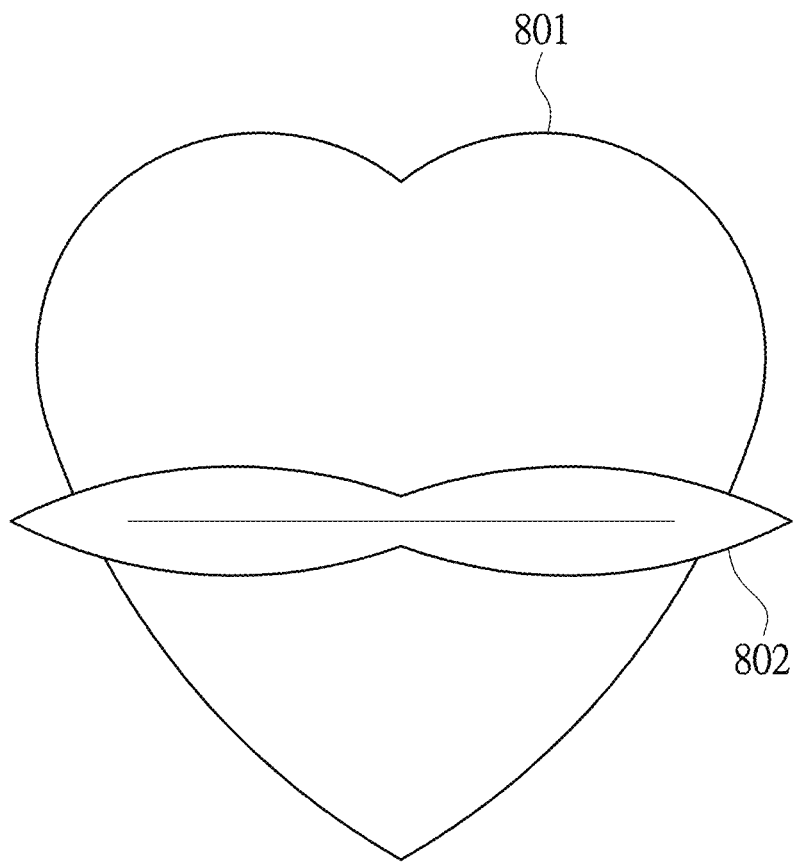
FIG. 8 shows a schematic diagram of the process for forming a computer sticker image according to one conventional technology.

The lens effect such as convex lens, concave lens or in combination thereof renders the visual effect for the border of the computer figure. One of the embodiments to apply the border effect to the computer figure can be shown by referring to the flow chart in FIG. 7.

In step S701, border information relating to the computer figure is first obtained. A border width is then defined, such as in step S703. The information relating to a portion of the background image corresponding to the border of the computer figure is obtained, such in step S705. Next, in step S707, the system may set different effect weights to the different border sections at different positions. In an exemplary example, if the border effect is a transparent mask, the effect weight indicates different transparencies and/or colors to the different border sections. In step S709, for different border sections of the computer figure, the various border effects with corresponding effect weights are applied to the pixels of the background image corresponding to the border sections.

In further embodiments of the present invention, when the lens effect is applied to the border image, different mask weights may be set to the border range of the background image corresponding to the border image of the computer figure according to a distance relationship. Reference is made to the description of FIG. 3A. The border effect varies with the different mask weights. The border effect can be the visual effect such as the mentioned convex lens or concave lens applied to the computer figure, and further in combination with the image effect that changes the transparency and/or colors. The image effect renders gradient changes of transparencies and colors.

Finally, the computer figure is configured to be merged to the background image, as in step S711.

The aforementioned schemes incorporating a lens effect can be referred to U.S. Pat. No. 6,810,151, application Ser. No. 09/985,558 on Nov. 5, 2001, that is directed to a method of performing a lens effect using a transform mask. This conventional method can be introduced to the method for processing the border of a computer figure to be merged to the background image in accordance with the present invention. After applying the method disclosed in the '151 patent, the computer system obtains the border information of the computer figure, and the pixel information of the background image corresponding to the border range. With respect to every background pixel within the border image range of the computer figure, a corresponding offset mask is provided. Every offset mask has an offset value. Further, the weight mask with different weight value is set to every background pixel. The aspect of the weight mask renders an offset value between two adjacent pixels. Every background pixel is configured to have a weight mask with different weight value. When every background pixel is applied with the offset mask and the weight mask, a range of the border image of the computer figure forms a lens effect in view of the background image. The computer figure with the border effect is then well merged to the background image.

Furthermore, U.S. Pat. No. 5,425,137, application Ser. No. 08/009,547 on Jan. 26, 1993, is directed to a method for processing an image employing a virtual lens that allows a user to simulate the lens effect to a selected image. A software-based tool is used to add, delete, and edit the lens object to an image. The method provided in accordance with the present invention employs an instant computation to calculate the border effect; alternatively, the '137 patent may be used to simulate the lens effect for the method of the present invention.

Nevertheless, the aforementioned schemes are references for proving the enforceability of the present invention, but may not be limitations in the present invention.

The disclosure of the present invention is also directed to a series of instructions executed in a computer device. A memory of the computer device stores the instructions that are executed by a process of the device for merging a computer figure to a background image by processing the border. The instructions include instruction for obtaining border information of a computer figure displayed in a computer display; instruction for determining position of the computer figure in response to touch signals; instruction for obtaining pixel information of a background image corresponding to a border image range of the computer figure; instruction for applying a border effect according to the pixel information of the background image corresponding to the border image range of the computer figure; instruction for forming the computer figure with the border effect to be merged to the background image; and instruction for recording variations of the computer figure according to touch signals in the process of moving, resizing, and/or rotating the computer figure.

Thus, according to the embodiments in the disclosure, the method for processing the border of a computer figure to be merged to the background image, and a related computer device, allows a user to operate a computer figure in a touch panel. The image effect is instantly calculated and applied to the computer figure in the process of movement. Rather than the conventional way to form the picture by simply combining the foreground image and background image, the present invention can produce the picture with a visual effect of merging the computer figure to the background image.

It is intended that the specification and depicted embodiment be considered exemplary only, with a true scope of the invention being determined by the broad meaning of the following claims.

What is claimed is:

1. A method for processing border of a computer figure to be merged into a background image, comprising:
    performing a border searching process for obtaining information including image coordinate values and image pixel values of a border of the computer figure displayed on a computer display;
    obtaining information of pixels of the background image corresponding to a border image range of the computer figure when the computer figure is going to be merged to the background image;
    responsive to the pixel information of the border image range of the background image, applying a border effect with different effect weights to the background pixels of the border at different positions, so as to create a new computer figure with the border effect to be merged to the background image;
    wherein the border effect is a pictorial effect of convex lens or concave lens applied to all or part of the border of the computer figure, and a plurality of different mask weights are set to the background image corresponding to the border of the computer figure according to a distance relationship;
    wherein the steps of obtaining information relating to the border of the computer figure, obtaining the pixel information of the background image corresponding to the border of the computer figure, and applying the border effect are continuously performed when a position of the computer figure is changed, a size of the computer figure is resized, and/or an angle of the computer figure is rotated.

2. The method as recited in claim 1, wherein the computer display has a touch panel by which the position of the computer figure is determined according to touch signals while the computer figure is moved; the size of the computer figure is determined according to touch signals while the computer figure is resized; and the angle of the computer figure is determined according to touch signals while the computer figure is rotated.

3. The method as recited in claim 2, wherein, in the process of moving the computer figure, resizing the computer figure and/or rotating the computer figure, the variations of the computer figure are recorded based on the changes of the touch signals.

4. The method as recited in claim 2, wherein the computer figure is a static image or an animation.

5. The method as recited in claim 4, wherein the border effect further comprises an effect of changing transparency and/or color.

6. A method for processing border of a computer figure to be merged into a background image, comprising:
    (a) providing a computer figure, displayed on a computer display with a touch panel, occupying a range over the touch panel;
    (b) in response to touch signals with respect to the computer figure, determining position of the computer figure;
    (c) performing a border searching process for obtaining border information including image coordinate values and image pixel values of the computer figure according to the ranged occupied by the computer figure and position of the computer figure;
    (d) obtaining pixel information of the background image corresponding to a border image range of the computer figure when the computer figure is going to be merged to the background image; and
    (e) applying a border effect with different effect weights to different positions of pixels of the background image corresponding to the border image range of the computer figure, so as to form a new computer figure with the border effect to be merged into the background image;
    wherein the border effect is a pictorial effect of convex lens or concave lens applied to all or part of the border of the computer figure, and a plurality of different mask weights are set to the background image corresponding to the border of the computer figure according to a distance relationship;
    wherein, the steps (c) to (e) are continuously performed when a position of the computer figure is changed, a size of the computer figure is resized, and/or an angle of the computer figure is rotated according to the touch signals with respect to the computer figure.

7. The method as recited in claim 6, wherein the border effect further comprises an effect of changing transparency and/or color.

8. The method as recited in claim 6, wherein the computer display has a touch panel by which the position of the computer figure is determined according to touch signals while the computer figure is moved; the size of the computer figure is determined according to touch signals while the computer figure is resized; and the angle of the computer figure is determined according to touch signals while the computer figure is rotated.

9. The method as recited in claim 8, wherein the border effect further comprises an effect of changing transparency and/or color.

10. The method as recited in claim 8, wherein, in the process of moving the computer figure, resizing the computer figure and/or rotating the computer figure, the variations of the computer figure are recorded based on the changes of the touch signals.

11. The method as recited in claim 10, wherein the border effect further comprises an effect of changing transparency and/or color.

12. A computer device including a processor and a memory, wherein the memory stores an instruction set executed by the processor for processing a border of a computer figure to be merged into a background image, the instruction set comprising:
    instruction for obtaining border information including image coordinate values and image pixel values of a computer figure displayed in a computer display by performing a border searching process;
    instruction for determining position of the computer figure in response to touch signals with respect to the computer figure;
    instruction for obtaining pixel information of a background image corresponding to a border image range of the computer figure when the computer figure is going to be merged to the background image;

instruction for applying a border effect with different effect weights to different positions of the pixels of the background image corresponding to the border image range of the computer figure, wherein the border effect is a pictorial effect of convex lens or concave lens applied to all or part of the border of the computer figure, and a plurality of different mask weights are set to the background image corresponding to the border of the computer figure according to a distance relationship;

instruction for forming a new computer figure with the border effect to be merged into the background image; and instruction for recording variation of the computer figure in response to touch signals in the process of moving the computer figure, resizing the computer figure and/or rotating the computer figure.

\* \* \* \* \*